(12) United States Patent
Takayama et al.

(10) Patent No.: US 11,281,924 B2
(45) Date of Patent: Mar. 22, 2022

(54) APPARATUS FOR ADJUSTING PARAMETER RELATED TO DEFECT DETECTION FOR IMAGE PROCESSING FOR IMAGE PROCESSING, METHOD FOR INFORMATION PROCESSING, AND PROGRAM

(71) Applicant: CANON KABUSHIKI KAISHA, Tokyo (JP)

(72) Inventors: Kei Takayama, Kawasaki (JP); Yusuke Mitarai, Tokyo (JP); Atsushi Nogami, Kawasaki (JP); Shoichi Hoshino, Tama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 22 days.

(21) Appl. No.: 16/801,031

(22) Filed: Feb. 25, 2020

(65) Prior Publication Data
US 2020/0279111 A1  Sep. 3, 2020

(30) Foreign Application Priority Data
Mar. 1, 2019  (JP) .............................. JP2019-037870

(51) Int. Cl.
*G06K 9/03* (2006.01)
*G06K 9/00* (2006.01)
(Continued)

(52) U.S. Cl.
CPC ......... *G06K 9/033* (2013.01); *G06K 9/00671* (2013.01); *G06K 9/2081* (2013.01);
(Continued)

(58) Field of Classification Search
CPC ........ G01N 21/8851; G01N 2021/8854–8896; G06T 7/0004–0008; G06K 9/03–036;
(Continued)

(56) References Cited

U.S. PATENT DOCUMENTS

2018/0137612 A1\*  5/2018  Li .......................... G06T 7/001
2018/0156736 A1\*  6/2018  Kondo .................. G06T 7/0008

FOREIGN PATENT DOCUMENTS

JP       2008-89574 A     4/2008
JP       2008-243059 A   10/2008
(Continued)

*Primary Examiner* — Casey L Kretzer
(74) *Attorney, Agent, or Firm* — Canon U.S.A., Inc. IP Division

(57) ABSTRACT

An apparatus includes a display control unit, a receiving unit, an adjusting unit, and a determination unit. The display control unit is configured to display an image showing a result of detection of a defect from a captured image of a structure on a display device. The receiving unit is configured to receive an operation to specify part of the displayed image as a first region and an operation to give an instruction to correct at least part of the detection data corresponding to the first region. The adjusting unit is configured to adjust a parameter to be applied to the first region according to the instruction. The determination unit is configured to determine one or more second regions to which the adjusted parameter is to be applied from a plurality of segmented regions of the image.

20 Claims, 17 Drawing Sheets

(51) Int. Cl.
    *G06K 9/50*     (2006.01)
    *G06K 9/20*     (2006.01)
    *G06K 9/62*     (2006.01)
    *G06T 7/00*     (2017.01)

(52) U.S. Cl.
    CPC ............ *G06K 9/50* (2013.01); *G06K 9/6212* (2013.01); *G06T 7/0004* (2013.01); *G06K 2009/6213* (2013.01)

(58) Field of Classification Search
    CPC .. G06K 9/033; G06K 9/00671; G06K 9/2081; G06K 9/50; G06K 9/6212; G06K 2009/6213
    See application file for complete search history.

(56) References Cited

FOREIGN PATENT DOCUMENTS

| | | | |
|---|---|---|---|
| JP | 2017-108409 A | 6/2017 | |
| WO | WO-2016172827 A1 * | 11/2016 | ........... G06T 7/0004 |
| WO | WO-2016189764 A1 * | 12/2016 | ............. G01N 21/88 |

* cited by examiner

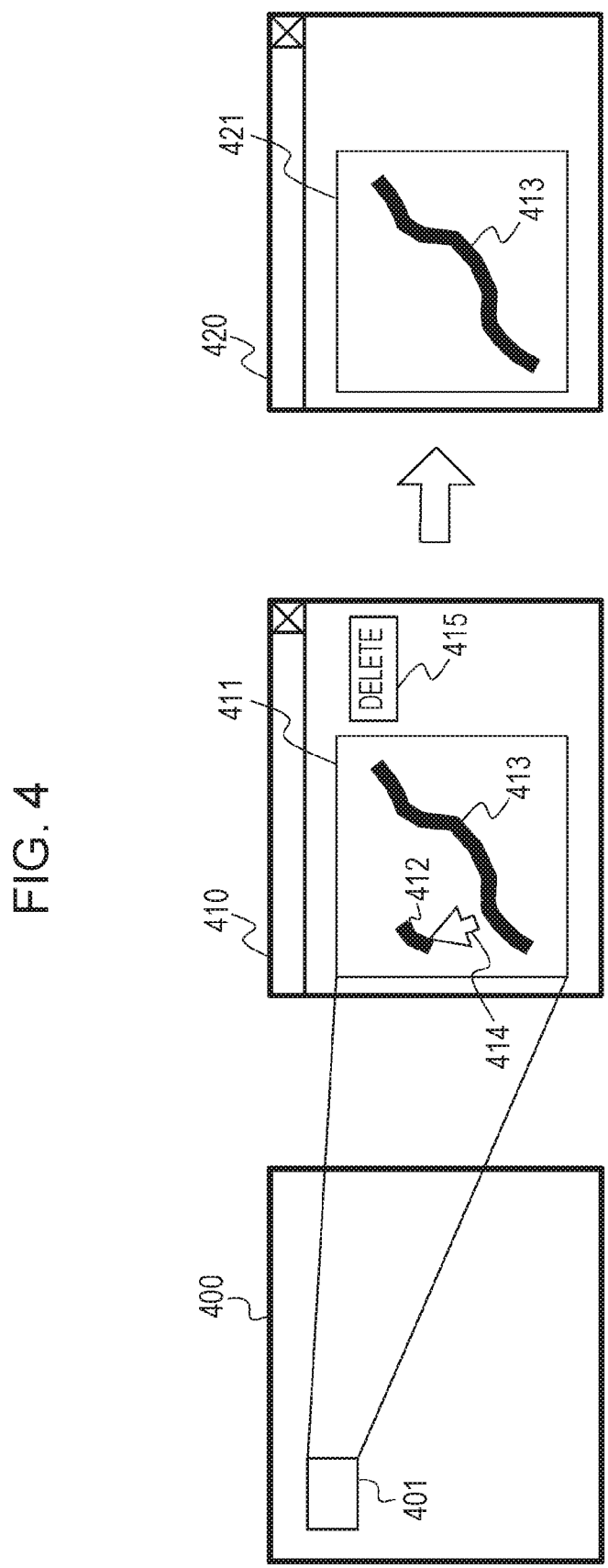

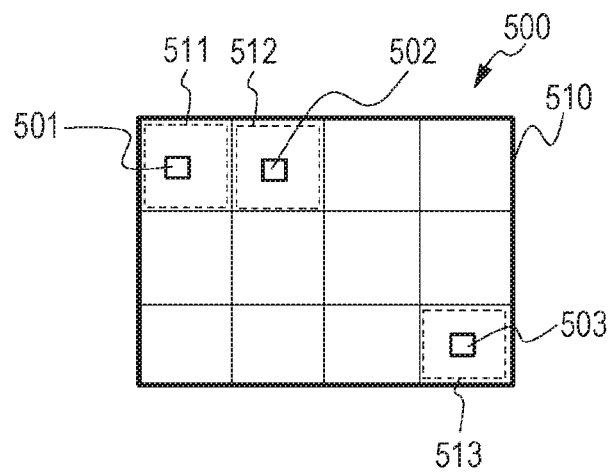

FIG. 12

| SEGMENTED REGION | SIMILARITY OF ATTRIBUTE | ACCEPT |
|---|---|---|
| area1 | 0.95 | YES |
| area2 | 0.75 | YES |
| area3 | 0.80 | NO |
| area4 | 0.90 | YES |
| area5 | 0.60 | — |

APPARATUS FOR ADJUSTING PARAMETER RELATED TO DEFECT DETECTION FOR IMAGE PROCESSING FOR IMAGE PROCESSING, METHOD FOR INFORMATION PROCESSING, AND PROGRAM

BACKGROUND

Field

One disclosed aspect of the embodiments relates to a technique for adjusting a parameter for image processing.

Description of the Related Art

In image processing, it is important to determine an appropriate parameter. In general, image processing using a plurality of candidate parameters is repeated for the entire image, and the user selects a relatively appropriate parameter by visually checking the processing result. However, there is a case where a parameter appropriate for one region in the image is not appropriate for another region. In such a case, setting an appropriate parameter for each region can provide a good processing result.

Japanese Patent Laid-Open No. 2008-243059 discloses a method for setting an appropriate parameter to each region. Specifically, regions of a color close to a predetermined color are automatically extracted from the image, and the user sets an appropriate parameter for the extracted regions. This method is efficient because the parameter can be set for regions with similar attributes.

In contrast, Japanese Patent Laid-Open No. 2008-89574 discloses a method for adjusting a parameter that requires only a small region for the user to see. Specifically, the user specifies a region of the image to be corrected and creates a target image by correcting the region. Then, an image processing parameter is adjusted so that the target image and the result of processing the original image match. This method is expected to simplify the operation because the parameter can be determined through correction without the need for the user to specify the parameter. This method also has the advantage that the part to be corrected can be reliably corrected.

However, the extracted regions may be dispersed on the image. In such a case, the technique disclosed in Japanese Patent Laid-Open No. 2008-243059 requires that the user sees the dispersed regions on the image to determine the parameter. For this reason, the user operation is troublesome particularly for a large image. The technique disclosed in Japanese Patent Laid-Open No. 2008-89574 requires specifying each of a plurality of regions to which parameters are to be set.

SUMMARY

One aspect of the embodiments provides an apparatus including an acquisition unit, a display control unit, a receiving unit, an adjusting unit, and a determination unit. The acquisition unit is configured to acquire detection data indicating a result of detection of a defect from a captured image of a structure. The display control unit is configured to display an image showing the detection data on a display device. The receiving unit is configured to receive an operation to specify part of the displayed image as a first region and an instruction to correct at least part of the detection data corresponding to the first region. The adjusting unit is configured to adjust a parameter related to the detection data and corresponding to the first region according to the received instruction. The determination unit is configured to determine one or more second regions to which the parameter applied to the first region is to be applied, the parameter being adjusted by the adjusting unit, from a plurality of partial regions obtained by segmenting the image.

Further features of the disclosure will become apparent from the following description of exemplary embodiments with reference to the attached drawings.

BRIEF DESCRIPTION OF THE DRAWINGS

FIG. 4 is a diagram illustrating an example display screen.

FIG. 5 is an explanatory diagram of segmented regions.

FIG. 6 is a diagram illustrating an example of a management table.

FIG. 12 is a diagram illustrating processing for determining second-region candidates.

DESCRIPTION OF THE EMBODIMENTS

Embodiments of the disclosure will be described hereinbelow with reference to the drawings.

Figure 1A:
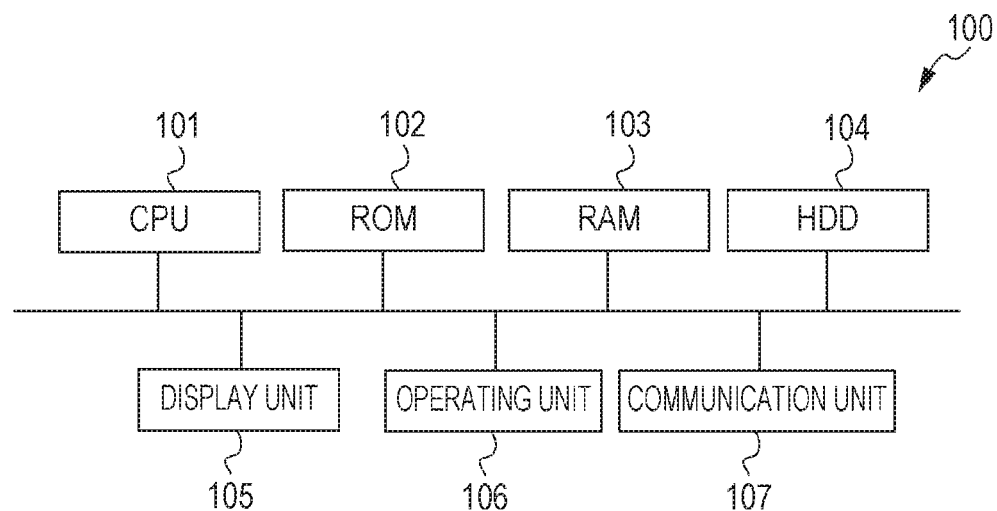
FIG. 1A is a diagram illustrating the hardware configuration of an information processing apparatus according to a first embodiment.
Figure 1B:
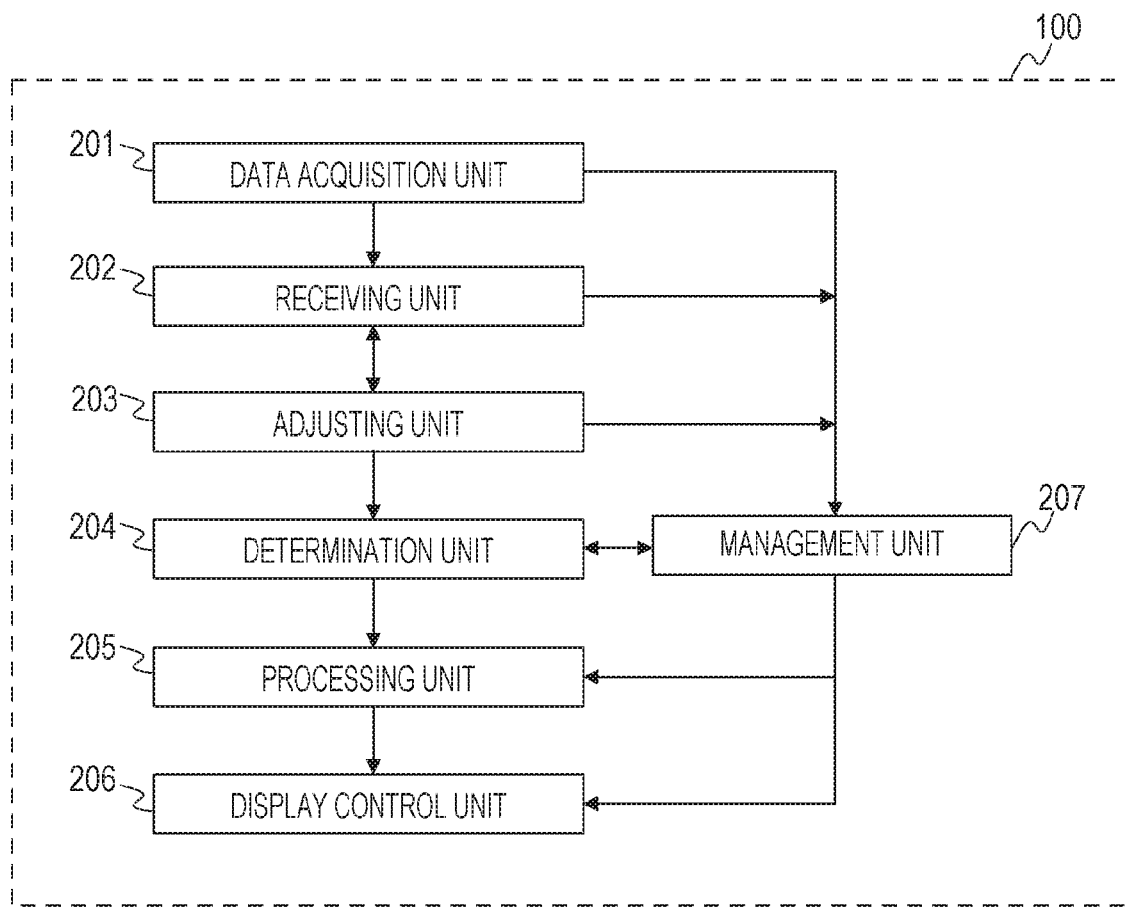
FIG. 1B is a diagram illustrating the functional configuration of the information processing apparatus.

An information processing apparatus according to a first embodiment is an apparatus for determining a parameter for use in image processing and a region to which the parameter is applied. FIG. 1A is a diagram illustrating the hardware configuration of an information processing apparatus 100 according to the first embodiment. FIG. 1B is a diagram illustrating the functional configuration of the information processing apparatus 100.

Data used in the embodiment will be described. The information processing apparatus 100 of the present embodiment corrects the result of detection of a defect (crack)

detected by recognition processing from a wall image of an infrastructure. Here, the defect is an example of the object to be detected. In the present embodiment, the image to be corrected is referred to as "correction target data". In the present embodiment, a detection model for detecting a crack from the captured image is created in advance to prepare the correction target data. By applying the detection model to an image of the wall of an infrastructure, data of the same size as the image is acquired in which values close to 1 are stored in pixels that appears to be defects and values close to 0 are stored in pixels that appear not to be defects. The data acquired by the method is hereinafter referred to as "probability map".

Figure 2:
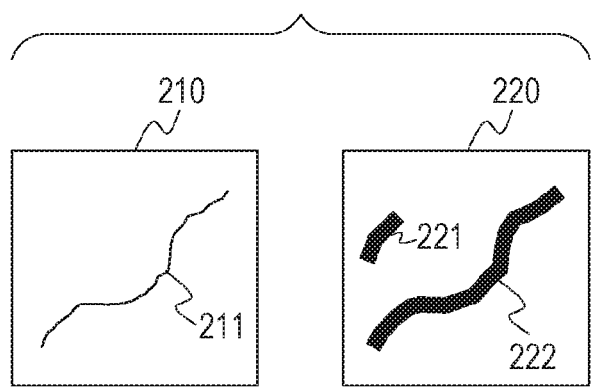
FIG. 2 is an explanatory diagram of an image.

In the present embodiment, a binary image acquired by applying threshold processing (in this case, binarization processing) to the probability map is used as the correction target data. An example of the binary image is illustrated in FIG. 2. An image 210 illustrated in FIG. 2 is an example of an image of a concrete wall, in which a curve 211 indicates a portion at which a crack is present. An image 220 in FIG. 2 is a binary image obtained by binarizing a probability map obtained by applying a model for detecting cracks to the captured image 210, in which regions 221 and 222 are regions that are determined to be apparently cracks. Hereinafter, the image obtained by applying threshold processing to the probability map obtained by applying the model to the captured image is referred to as "detection result". A continuous pixel region on the detection result in which values greater than 0 are stored, for example, the regions 221 and 222, is referred to as "detected region".

The information processing apparatus 100 of the present embodiment interprets, of the detected regions of the detection result, detected regions that are smaller than a predetermined area to be misdetected regions in which non-cracked objects are detected by mistake and performs correction to delete the misdetected regions from the detection result. A parameter that the information processing apparatus 100 of the present embodiment uses is the area of the detected region, which is used as the reference for deleting the misdetected region from the detection result.

A processing procedure of the information processing apparatus 100 for correcting the correction target data, described above, will be illustrated in outline. First, the information processing apparatus 100 instructs the user to set a small region to be corrected on the detection result. Specifically, the information processing apparatus 100 instructs the user to select a detected region that may be a misdetected region from the detected regions of the detection result and to delete the region. The region set by the user's selecting operation is hereinafter referred to as "first region". Upon receiving the deletion instruction, the information processing apparatus 100 adjusts the parameter (in this case, the reference area for deleting the detected region) so that the detected region, or the first region, is deleted. Thereafter, the information processing apparatus 100 assumes that a region whose image feature (in this case, the texture of the captured image) is similar to the image feature of the first region on the captured image may be subjected to processing for deleting the detected region using the parameter adjusted for the first region and executes the deleting processing. The region to which the image processing using the parameter adjusted for the first region is hereinafter referred to as "second region". Data obtained by executing the image processing using the adjusted parameter on the correction target data is referred to as "processing execution result".

Thus, the information processing apparatus 100 of the present embodiment adjusts the parameter for part of the image and applies image processing using the adjusted parameter to a wider range. An advantage is that the information processing apparatus 100 instructs the user to correct a small region of the image, not the whole image to become ideal, so that the region to be viewed by the user can be small. Another advantage is that image processing using the adjusted parameter is applied to a wider range, which is efficient. Lastly, the input and output of the information processing apparatus 100 of the present embodiment will be described. The input includes correction target data, a user instruction to set the first region, and an instruction to correct the first region. The output is a processing execution result obtained by applying processing using a parameter appropriate for the first region to the second region of the correction target data.

As illustrated in FIG. 1A, the information processing apparatus 100 includes a central processing unit (CPU) 101, a read-only memory (ROM) 102, a random access memory (RAM) 103, a hard disk drive (HDD) 104, a display unit 105, an operating unit 106, and a communication unit 107. The CPU 101 reads control programs stored in the ROM 102 and executes various processes. The RAM 103 is used as a temporary storage of the CPU 101, such as a main memory and a working area. The HDD 104 stores various pieces of data and various programs. The display unit 105 displays various pieces of information. The operating unit 106 includes a keyboard and a mouse to receive various user operations. The communication unit 107 performs communication processing with an external apparatus, such as an image forming apparatus, via a network.

The functions and processes of the information processing apparatus 100, described later, are implemented by the CPU 101 reading programs stored in the ROM 102 or the HDD 104 and executing the programs. In another example, the CPU 101 may read programs stored in a recording medium, such as a secure digital (SD) card, instead of the ROM 102 or the like.

In another example, at least part of the functions and processes of the information processing apparatus 100 may be implemented by the cooperation of the CPU, the RAM, the ROM, and the storage. In still another example, at least part of the functions and processes of the information processing apparatus 100 may be implemented using a hardware circuit.

FIG. 1B is a diagram illustrating the functional configuration of the information processing apparatus 100. The information processing apparatus 100 includes a data acquisition unit 201, a receiving unit 202, an adjusting unit 203, a determination unit 204, a processing unit 205, a display control unit 206, and a management unit 207. The data acquisition unit 201 acquires correction target data from the HDD 104. The acquisition source is not limited to the HDD 104. The data acquisition unit 201 may acquire the correction target data from an external apparatus via the communication unit 107. The receiving unit 202 receives an instruction to set the first region and an instruction to correct the first region from the user. The adjusting unit 203 adjusts the parameter to be applied to the first region according to the correction instruction. The determination unit 204 determines a second region to which processing using the adjusted parameter is to be applied, based on the attribute of the first region. The management unit 207 manages the correction target data acquired by the data acquisition unit 201, the parameter adjusted by the adjusting unit 203, and the information acquired in the processing performed by the determination unit 204.

The processing unit 205 receives the parameter and the information on the second region from the management unit 207 and executes processing using the parameter on the second region to obtain a processing execution result. The display control unit 206 displays the correction target data received from the data acquisition unit 201 and the processing execution result received from the processing unit 205 on a display screen. At that time, the receiving unit 202 receives an operation related to a determination whether to accept update of the original correction target data using the processing execution result from the user. When the user accepts the update, the management unit 207 updates the processing execution result and manages the latest correction target data.

The management unit 207 is not an essential component of the information processing apparatus 100. The information processing apparatus 100 may not include the management unit 207 when the adjusting unit 203 or the determination unit 204 sends information directly to the processing unit 205 or when the user corrects the data only once.

Figure 3:
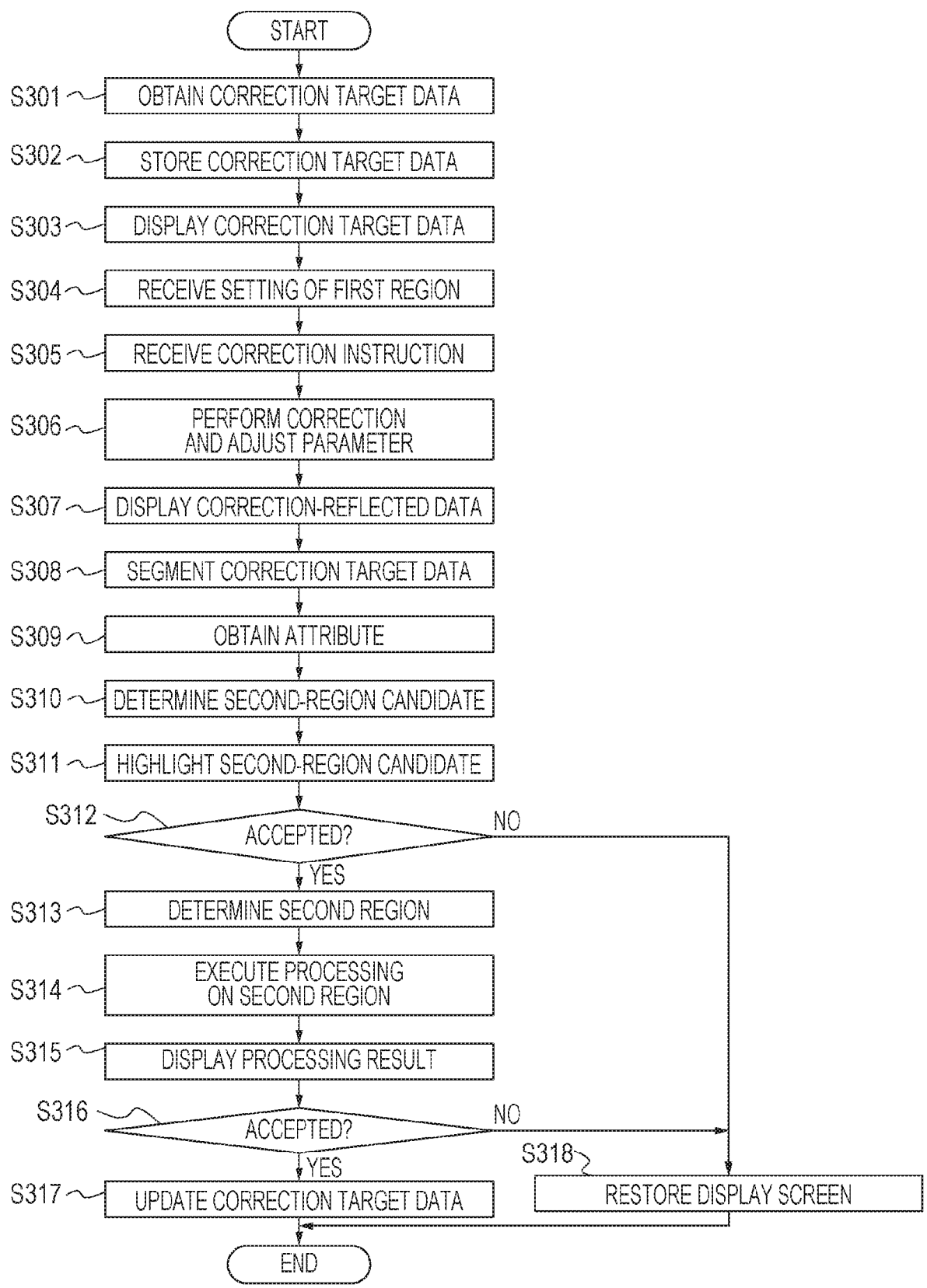
FIG. 3 is a flowchart for image processing.

FIG. 3 is a flowchart for image processing performed by the information processing apparatus 100. The operations in the flowchart may be performed by the corresponding processor executing a program from the memory. First at S301, the data acquisition unit 201 acquires correction target data. As described above, the correction target data is an image (binary image) obtained by detecting a crack from a wall image of an infrastructure. In the present embodiment, the image illustrated in FIG. 4 is correction target data 400. The correction target data 400 is a whole wall image.

Next at S302, the management unit 207 receives the correction target data 400 and stores the received correction target data 400 in a storage unit, for example, the ROM 102. Since the management unit 207 stores the correction target data 400, the original correction target data 400 can be recovered when the user wants to cancel processing applied to the correction target data 400.

Next at S303, the display control unit 206 displays the correction target data 400 on the display unit 105. FIG. 4 is a diagram illustrating an example display screen on which the correction target data 400 is displayed. An image 411 on a display screen 410 is a detection result, which is an enlarged image of a partial region 401 of the correction target data 400. A detected region 413 in the detection result 411 is a correctly detected crack, and a region 412 is a misdetected scratch in the wall surface. It is not absolutely necessary to display the partial region 401 of the correction target data 400 in enlarged view as in the display screen 410. However, the enlarged view makes it easier to visually check the portion to be corrected because the present embodiment uses a huge wall image as the correction target data. In an example method for changing the display scale, the user moves a mouse wheel while pressing a Ctrl key, with a mouse pointer placed on the portion to be enlarged via the receiving unit 202. Then the display control unit 206 reflects the user operation by displaying the portion of the mouse pointer in enlarged or reduced size.

The data acquisition unit 201 may acquire the original captured image in addition to the detection result, or the correction target data, and the display control unit 206 may superpose and display the detection result on a position on the captured image corresponding to the detection result. This makes it easy for the user to check the detected region with the crack position of the captured image. Adding a function for displaying the detection result of the superposed image in a transparent color, a function for displaying the detection result shifted, or a function for switching the superposed image and the captured image advantageously improves the visibility of the detection result.

Next at S304, the receiving unit 202 receives an instruction to set a region of the detection result 411 that needs to be particularly corrected, that is, the first region, according to a user operation. Next at S305, the receiving unit 202 receives an instruction to correct the first region. In the present embodiment, the user sets, as the first region, a detected region having a small area, which may be a misdetected region of the detection result, while checking the captured image, and performs processing for deleting the misdetected region. In the example of the display screen 410 in FIG. 4, the user wants to delete the misdetected region 412. In this case, the user selects the detected region 412 with a mouse pointer 414 to set the detected region 412 as the first region and further selects a delete button 415. Displaying the set first region in a different color or displaying the boundary of the first region in a different color from the surrounding makes it easy for the user to recognize what portion is selected.

Next at S306, the adjusting unit 203 and the processing unit 205 adjust the parameter appropriate for the first region to the instruction of the user. The procedure is as follows: the processing unit 205 executes the processing on the first region while changing the value of the parameter. If the processing execution result includes a result that matches the user instruction, the adjusting unit 203 uses a parameter used when the processing execution result is obtained as an appropriate parameter. Specifically, when deleting the detected region 412 displayed on the display screen 410 in FIG. 4, the adjusting unit 203 changes the area of the detected region, which is a reference parameter (threshold) used for deletion, from a small value to a greater value. As the parameter is changed, the processing unit 205 repeatedly executes the processing for the detected region 412 to obtain a processing execution result. As a result, the parameter obtained when the detected region 412 is first deleted is adopted as an appropriate parameter. Thus, the adjustment of the parameter is performed by automatically searching for an appropriate parameter.

When the parameter is adjusted, the display control unit 206 displays a display screen 420 showing the correction result as at the right of FIG. 4. The display screen 420 displays a processing execution result 421 in which the detected region 412 is deleted.

The above method is for searching for a parameter appropriate for the first region. Another method may be used in which an appropriate parameter is searched for a small region of any size (for example, the image 411) including the first region. Still another method for determining the parameter in the present embodiment is a method of calculating the area of the selected detected region and using the calculated value as the parameter. The processing at S306 is an example of the parameter determination processing.

Next at S307, the display control unit 206 displays a processing execution result using the parameter adopted by the above method as data that reflects the user correction. The data that reflects the user correction to the first region is hereinafter referred to as "correction reflected data".

The second region to which the processing using the adjusted parameter is applied is determined on the correction reflected data. The processing using the adjusted parameter is applied to the determined second region to correct the correction target data. Step S308 and the subsequent steps are this processing. From S308 to S310, the determination unit 204 determines the second region to which the processing using the parameter adjusted by the adjusting unit 203 is to be applied on the basis of the first region.

First at S308, the determination unit 204 segments the correction target data. The partial regions obtained by the segmentation are each hereinafter referred to as "segmented region". In the present embodiment, the determination unit 204 segments the correction target data into rectangular regions of any size. The coordinate information on the regions is stored in a storage unit and is managed by the management unit 207. The determination unit 204 segments correction target data 500 into, for example, a plurality of partial regions (for example, 511, 512, and 513) in the form of a grid, as illustrated in FIG. 5.

Next at S309, the determination unit 204 acquires the attributes of the segmented regions and the first region. In the present embodiment, image features are acquired as the attributes. In other examples, the attribute may be information on the detection result or coordinate information. Examples of the image features include color, saturation, luminance, and texture information. In this case, texture information is used. The determination unit 204 can acquire texture information by applying Fourier analysis or another method to the image. In the present embodiment, the determination unit 204 acquires the texture information from the original wall image in the correction target data for each segmented region.

Next at S310, the determination unit 204 determines second-region candidates based on the similarity between the attributes of the segmented regions. Specifically, the determination unit 204 determines the similarity between the attributes of the segmented region including the first region and the attributes of the individual segmented regions and determines a segmented region including the first region and segmented regions similar to the region as second-region candidates. In the present embodiment, the determination unit 204 groups the segmented regions by clustering the segmented regions based on the texture information on the individual segmented regions of the captured image to determine the similarity. The clustering is a method for classifying a data set into a plurality of groups base on the distribution. As a result of grouping, the determination unit 204 determines segmented regions that belong to the segmented region including the first region as second-region candidates. The processing of S310 is an example of second-region-candidate determination processing for determining the second region according to a predetermined condition for the image (similarity of the attribute).

For example, the segmented region 512 and the segmented region 511 in FIG. 5 belong to the same group, while the segmented region 513 and the segmented region 511 belong to different groups. A region 501 in the segmented region 511 is the first region. In this case, the determination unit 204 determines the region 511 including the first region 501 and the segmented region 512 of the same group as the segmented region 511 as the second-region candidates.

In the present embodiment, when determining the similarity, the determination unit 204 determines the similarity between the attribute of the segmented region including the first region and the attributes of the individual segmented regions. However, in another example, the determination unit 204 may determine the similarity between the first region itself and the individual segmented regions unless the first region is an extremely small region with 100 pixels or less.

Although not absolutely necessary, information on the segmented regions, attributes, and similarity obtained in the processing performed by the determination unit 204 can be stored in a storage unit as a management table and can be managed by the management unit 207. FIG. 6 is a diagram illustrating an example of the management table 600. In the management table 600, the numbers of the segmented regions and records with which the groups of the segmented regions are associated are stored in association with the individual segmented regions. Thus managing the information using the management unit 207 eliminates the need for repeatedly calculating attribute information on each segmented region when receiving a correction instruction for a plurality of first regions from the user.

Next at S311, the display control unit 206 displays the second region candidates on the display screen in a highlighted manner. Two methods for highlighting second-region candidates will be described with reference to FIG. 7.

Figure 7:
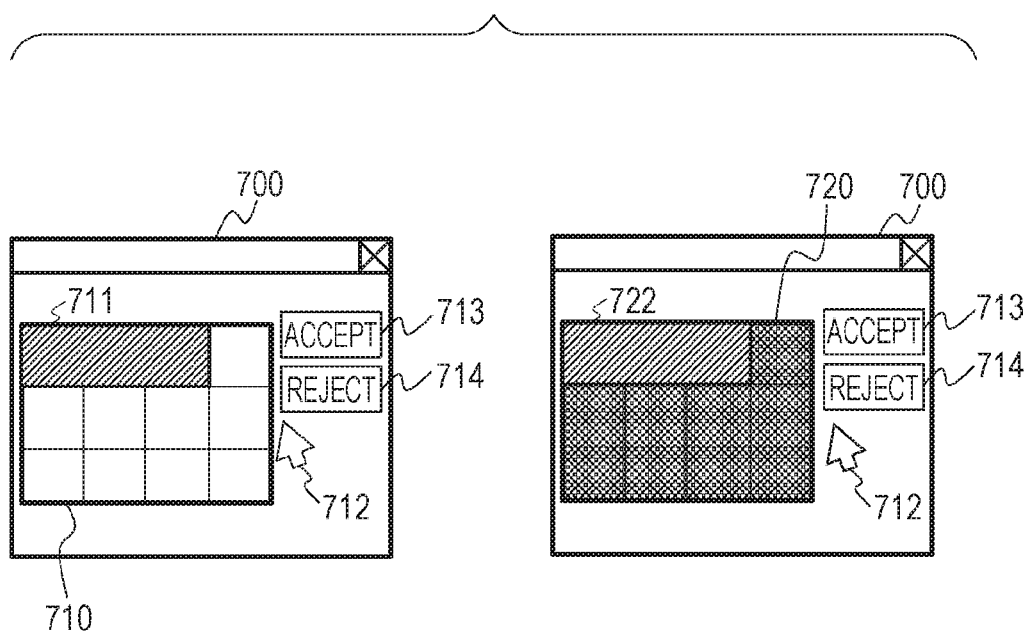
FIG. 7 is a diagram illustrating an example display screen.

A first method is a method of displaying the boundary of the second-region candidates in color. In a specific example, an image 710 in a display screen 700 of FIG. 7 shows correction target data, which is the same data as the correction target data 510 in FIG. 5. A region 711 shows a second-region candidate. The boundary of the region 711 of the second-region candidate is displayed in a color that is prominent when displayed on the wall image, for example, red, in other words, a color different from the color of the processing target data. This makes it easy for the user to recognize to what range the processing using the adjusted parameter is applied.

A second method is a method of superposing a predetermined color on a region other than the second-region candidate. In a specific example, a dark color is superposed on a region of correction target data 720 except a second-region candidate 722 on the display screen 700 in FIG. 7. Thus displaying a region other than the second-region candidate in a dark color reduces the visibility of the region other than the second-region candidate, allowing the user to operate while checking only a minimum required region without viewing a region that the user does not need to view. The region other than the second-region candidate may be subjected to processing for converting the brightness by general image processing so that the region other than the second-region candidate becomes darker than the second-region candidate. This processing provides the same advantageous effects as those of the method of superposing a predetermined color on the region other than the second-region candidate.

The image in which the second-region candidate is highlighted and the image before being highlighted may be switched and displayed, for example, by the user clicking the mouse. This makes it easy for the user to recognize the changed portion, facilitating determination whether to accept the second-region candidate.

Next at S312, the receiving unit 202 receives an instruction on whether to accept the second-region candidate as the second region according to a user operation. In the example of the display screen 700 in FIG. 7, if the user accepts the second-region candidate, the user selects an accept button 713 using a mouse pointer 712. If the user rejects the second-region candidate, the user selects a reject button 714. If the receiving unit 202 receives an accept instruction (YES at S312), the processing proceeds to S313. If the receiving unit 202 receives a reject instruction (NO at S312), the processing goes to S318. At S313, the determination unit 204 determines the second-region candidate as the second region. At S318, the display control unit 206 stops the highlighting and restores the initial display screen. Thus, the image processing ends.

At S314 after S313, the processing unit 205 executes processing on the second region to obtain a processing execution result. In the present embodiment, the processing unit 205 regards a detected region in the second region smaller than a predetermined area as a misdetected region from the crack detection result and deletes the smaller detected region. The parameter used by the processing unit 205 is an area used as the criterion for determination on deletion.

Figure 8A:
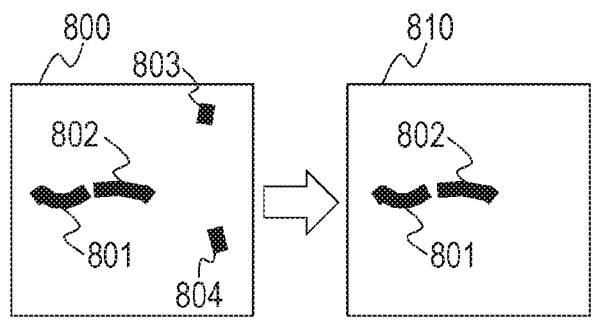
FIGS. 8A and 8B are explanatory diagrams of a processing unit.
Figure 8B:
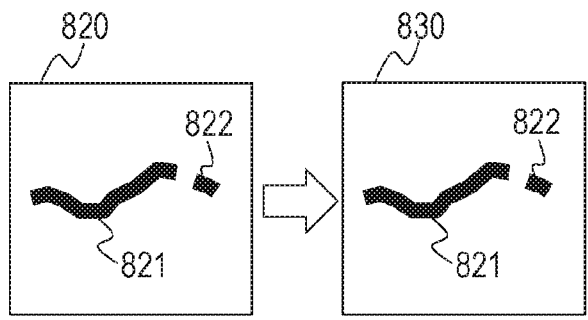

Referring to FIGS. 8A and 8B, the processing of the processing unit 205 will be described. An image 800 in FIG. 8A and an image 820 in FIG. 8B correspond to the region 502 and the region 503 in FIG. 5, respectively. The segmented region 512 including the region 502 is the second region, and the segmented region 513 including the region 503 is not the second region. Regions 801, 802, 803, 804, 821, and 822 are crack detected regions of the detection result. An image 810 is a processing execution result obtained by processing the image 800 with the processing unit 205. Since the image 800 is included in the second region determined by the determination unit 204, the detected regions 803 and 804 smaller than the reference area for deletion are deleted from the processing execution result 810 as a result of the processing performed by the processing unit 205. In contrast, the image 820 and an image 830 are correction target data of a region not included in the second region before and after the processing, respectively, in which the detected region 822 smaller than the reference area for deletion remains without being deleted.

Next at S315, the display control unit 206 displays the processing execution result on the display screen. This processing is an example of output control processing. This prompts the user to check the processing execution result. Next at S316, the receiving unit 202 determines whether an instruction to accept update of the correction target data to the processing execution result has been accepted. If the receiving unit 202 has accepted the accept instruction (YES at S316), the processing proceeds to S317. If the receiving unit 202 has not accepted the accept instruction, in other words, has accepted a reject instruction (NO at S316), the processing goes to S318. At S317, the management unit 207 updates the managed correction target data to the processing execution result. Thus, the image processing is completed.

Thus, the information processing apparatus 100 of the present embodiment can adjust the parameter by using the first region, which is part of the image, and can appropriately determine the second region to which image processing using the adjusted parameter is to be applied.

Furthermore, the information processing apparatus 100 may regard the processing execution result at the end of the image processing as the latest correction target data and may repeatedly execute a sequence of processing while changing the first region. This simplifies correction of the whole image, finally allowing the user to acquire an ideal image.

Figure 9:
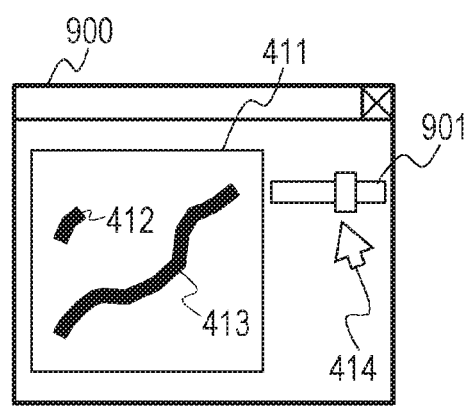
FIG. 9 is a diagram illustrating processing for parameter adjustment.

In the above description, upon receiving a correction instruction from the user at S305, an appropriate parameter is automatically searched for at S306, and correction reflected data is displayed at S307. In another example, the information processing apparatus 100 may perform the above processing in one operation and may search for an appropriate parameter according to a user operation. This method will be described with reference to a display screen 900 in FIG. 9. The user determines an appropriate parameter while viewing a change in the first region 412 on the display screen 900. For the operation, an adjusting bar 901 for adjusting the parameter may be used. When the user moves the tub of the adjusting bar 901 to the right and left with the mouse pointer 414, the processing unit 205 performs processing using the parameter selected at that time, so that the display control unit 206 displays the processing execution result. This operation and display allows the user to determine a parameter for deleting the first region 412 while adjusting the adjusting bar 901.

The above method is a method of grouping for determining the similarity. In another example, the information processing apparatus 100 may calculate the similarity between the first region or a segmented region including the first region and each segmented region. The information processing apparatus 100 determines, of the segmented regions, the segmented region including the first region and a segmented region whose attribute is similar to the attribute of the region including the first region to be the second-region candidate. This method increases the calculation amount unlike the method of grouping, because the similarity has to be calculated every time the first region is changed. However, the method of determining that a segmented region with high similarity is more likely to be the second region is advantageous in that it allows presenting information in order from the information that is more likely to be the second region and that is desirably to be first checked by the user.

Correction of Second Region Candidate

In the above description, a user operation for determination on whether to accept the second-region candidate as the second region is described at step S312. However, there may be case in which the user wants to accept part of the second-region candidate but does not want to accept the other. In such a case, if the receiving unit 202 has a function for accepting an operation for correcting the second-region candidate, flexible correction according to user's preference can be performed. Three correction methods will be described hereinbelow.

Figure 10A:
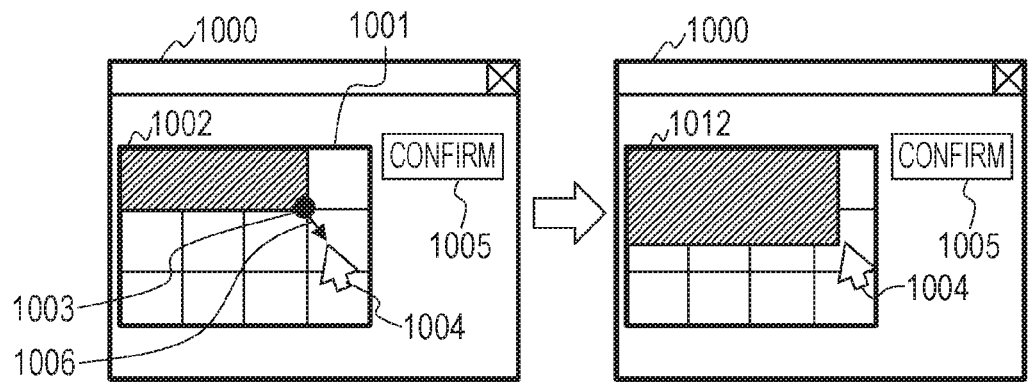
FIGS. 10A to 10D are diagrams illustrating processing for correcting a second-region candidate.

A first correction method of enlarging and reducing the second-region candidate based on the position of the mouse pointer will be described with reference to a display screen 1000 illustrated in FIG. 10A. The display screen 1000 highlights a region 1002 of the correction target data 1001 as the second-region candidate. The user selects a corner 1003 of the second-region candidate 1002 using a mouse pointer 1004 and drags the corner 1003 in an enlarging direction (the direction of arrow 1006). This operation causes the second-region candidate 1002 of the correction target data 1001 to be corrected to a region 1012 on the display screen 1000, illustrated at the right of FIG. 10A. When the second-region candidate is corrected to a region desired by the user, the user selects a confirm button 1005 using the mouse pointer 1004 to determine the second-region candidate as the second region. This method allows the user to finely adjust the range of the correction region candidate.

Figure 10B:
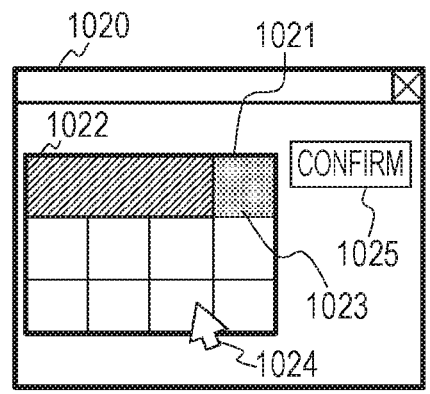

A second correction method of adding or deleting the second-region candidate in units of segmented regions will be described with reference to a display screen 1020 illustrated in FIG. 10B. On the display screen 1020, a region of a correction target data 1021 other than the second-region candidate can be added as a second-region candidate in units of segmented regions. The user selects a segmented region 1023 using a mouse pointer 1024. This operation causes the segmented region 1023 to be added to a second-region candidate 1022. After the second-region candidate is corrected to a desired range, the user selects a confirm button 1025 using a mouse pointer 1024. Thus, the second-region candidate is determined as the second region. Part of the second-region candidates can be excluded by a similar procedure. In this case, a segmented region included in the second-region candidate is selected, and the selected segmented region is excluded from the second-region candidate. The above method facilitates the user operation because the second region can be changed at one click.

Figure 10C:
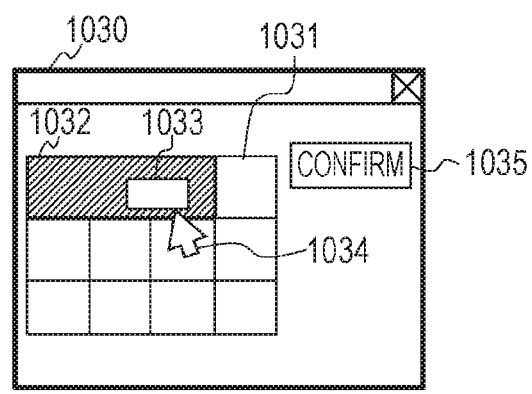

A third correction method of specifying, of the second-region candidate, a nonapplied region to which the parameter applied to the first region is not applied, will be described with reference to a display screen 1030 illustrated in FIG. 10C. Assume that the user wants to exclude a region 1033 from a second-region candidate 1032 of correction target data 1031 displayed on the display screen 1030. The user selects the region 1033 using a mouse pointer 1034. For selection, the user drags the mouse pointer 1034 from the upper left corner to the lower right corner of the region 1033, for example. As a result of the operation, the second-region candidate 1032 is modified to a region without the region 1033. When the second-region candidate is modified to a desired range, the user selects a confirm button 1035 to determine the second-region candidate as the second region. This method allows the user to correct the data while excluding a region where the user does not want to perform processing using a parameter.

Figure 10D:
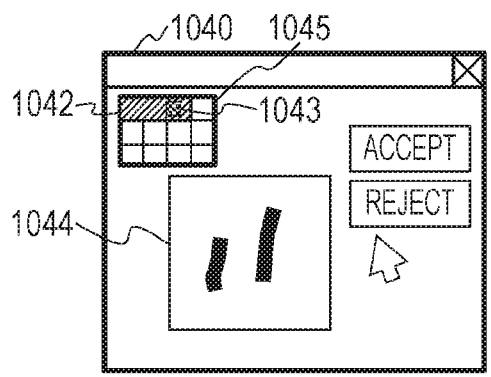

In the above example, the display control unit 206 displays the entire correction target data to prompt the user to check the second region. In another example, the user may change the scale of the display area while highlighting. A specific example will be displayed on a display screen 1040 in FIG. 10D. An image 1044 on the display screen 1040 is an enlarged image of a region 1043 included in a second-region candidate 1042 of correction target data 1045. The enlarged region 1043 on the correction target data 1045 is highlighted in a different color from the surrounding region. This allows the user to view the enlarged screen while checking what portion in the whole image of the correction target data 1045 the user is viewing, allowing reliable determination.

Sequential Highlighting

Figure 11:
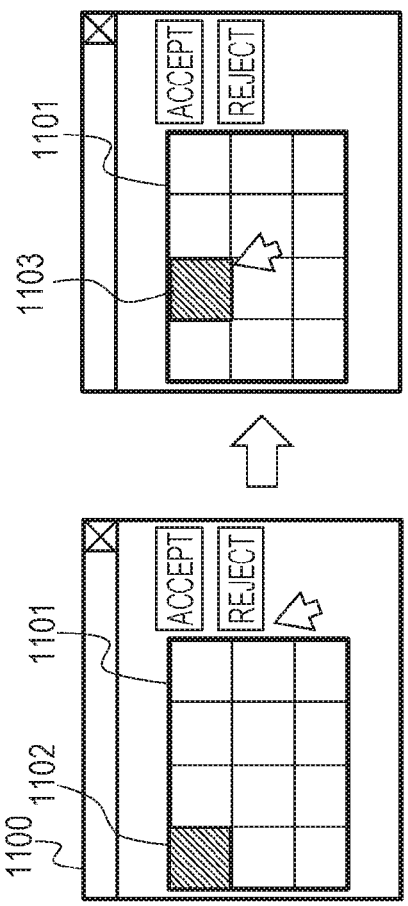
FIG. 11 is a diagram illustrating highlighting processing.

In the above, the display control unit 206 highlights the second-region candidate at a time. If a plurality of segmented regions are second-region candidates, the second-region candidates may be highlighted one by one, without being highlighted at a time. A specific example is illustrated in FIG. 11. A display screen 1100 displays the highlighted second-region candidate on a per segmented region basis (in units of partial regions). The display control unit 206 highlights one segmented region 1102 as a second-region candidate of the correction target data 1101. When the user accepts or rejects the second-region candidate 1102 as the second region, the highlighted second-region candidate is changed from the segmented region 1102 to a segmented region 1103, as in the right diagram of FIG. 11. For the order of highlighting, there are a method of displaying images from the region closest to the first region and a method of displaying images in order of higher similarity between a segmented region including the first region and each segmented region. Changing the region to be highlighted allows the user to correct the data while reliably checking the segmented regions one by one. In the present embodiment, the second regions are grouped in one region. In another example, the second regions are separate from each other. In that case, the second regions may be displayed group by group in sequence.

Displaying Multiple Second Region Candidates

In the above example, texture information is obtained as the attribute. In another example, the determination unit 204 may obtain a plurality of kinds of attribute. The determination unit 204 determines the second-region candidate for each attribute. The display control unit 206 displays the determined second-region candidate for each attribute. The receiving unit 202 allows the user to select a desired one of the plurality of second-region candidates that differ depending on the attribute. The display control unit 206 highlights the second-region candidates while switching them for each attribute. This makes it easy for the user to compare the second-region candidates for each attribute. Thus, the display control unit 206 displays the second-region candidates in a manner as to be distinguishable from the other regions.

Management of Definite Portion

In the above description, the management unit 207 manages the attribute for each segmented region. Alternatively, the management unit 207 may regard the region directly operated by the user as a definite region and may separately manage the definite region. For example, the management unit 207 may manage the region corrected as the first region as a definite region, and in the subsequent processing, may set the regions other than the definite region as second-region candidates regardless of the attribute. Managing the definite region prevents the corrected region from being modified and not being asked for acceptance as the second-region candidate, reducing checking operations troublesome for the user.

In the above description, when an instruction for correction is given for one first region, the adjusting unit 203 determines an appropriate parameter. However, multiple instructions for correction may be given. For example, the user sets a window (a rectangular region) including a plurality of detected regions as the first region via the receiving unit 202 and executes an operation for selecting and deleting a detected region of the first region a plurality of times. An example of the setting of the first region is to drag the mouse pointer around the region to be the first region to set a window whose diagonal is formed between the start and end points of the drag operation as the first region. The adjusting unit 203 obtains appropriate parameters for deleting the individual detected regions, calculates the average value of the parameters adjusted to correct the individual detected regions, and determines the average value as an appropriate parameter for the first region. Thus statistically adjusting the parameters in consideration of the plurality of correction instructions reduces the influence of outliers.

The determination unit 204 may determine the second-region candidate based on the past operation history. This processing will be described with reference to FIG. 12. The first column of the table shows information on the segmented regions of certain correction target data, and the second column shows the result of calculation of the similarity between each segmented region and the first region. Here, a segmented region whose similarity to the first region is high is assumed to has a high possibility of being accepted as the second region by the user. For example, a segmented region having a similarity of 0.7 or higher is determined as a second-region candidate. Segmented regions that satisfy the criterion, that is, area 1, area 2, area 3, and area 4, are determined to be second-region candidates. The user is asked to determine whether to accept the second-region candidates as the second regions via the display control unit 206 and the receiving unit 202. The third column of the table in FIG. 12 shows the result of determination on the acceptance of the user, in which acceptance is expressed as YES, and rejection is expressed as NO. Here, the second-region candidate area 1, area 2, and area 4 are accepted as second regions by the user. The determination unit 204 resets the criterion for determining second-region candidates from the segmented regions using the similarity of the attributes of the segmented regions accepted by the user. For example, the determination unit 204 sets the average value or the minimum value of 0.95, 0.75, and 0.90, which are respectively the similarities of the attributes of area 1, area 2, and area 4, as a new criterion.

In addition to the method of obtaining the average value or the minimum value, the criterion for determining second-region candidates may be determined from the distribution of similarities by a discriminant analysis. The discriminant analysis is a method for estimating which group the data belongs to based on the distribution of the data. The criterion is determined based on the similarity to the past data and acceptance information using this method, and the determination unit 204 determines whether to accept the segmented region as a second-region candidate from the attribute newly obtained. Thus determining the criterion from the past history allows the user to select a desired display method. In the present embodiment, a partial region on the correction target data is determined as the second region. Alternatively, the entire correction target data may be determined as the second region.

Lastly, a supplementary explanation will be given to the above procedure. First, the processing from S310 to S316 may not be performed in this order. For example, after determining second-region candidates at S310, the information processing apparatus 100 may execute the processing on the second-region candidates at S314, display the processing execution result at S315, and prompt the user at S316 to determine whether to accept update of the data. Thus executing the processing with the processing unit 205 before obtaining the determination on acceptance from the user allows the user to determine whether to accept update of the data while viewing the processing execution result, making it easy for the user to make a determination. Alternatively, the information processing apparatus 100 may omit the processing related to the determination on user's acceptance at S312 and S316. In this case, the information processing apparatus 100 may determine the second-region candidates as the second regions. This reduces the processing time.

Second Embodiment

An information processing apparatus 100 according to a second embodiment will be described mainly on the difference from the information processing apparatus 100 according to the first embodiment. The correction target data that the information processing apparatus 100 according to the present embodiment copes with is the detection result of a crack detected from a wall image of an infrastructure, as described in the first embodiment. The information processing apparatus 100 according to the first embodiment makes a correction to delete a misdetected region from the detection result, whereas the information processing apparatus 100 according to the second embodiment corrects a region that may be undetected. For example, there may be a case where the whole of one crack cannot be detected but partially detected. In the present embodiment, such a case is supposed, and the processing unit 205 combines two detected regions to correct the possible undetected region.

Unlike the first embodiment, the information processing apparatus 100 of the second embodiment corrects the detected region using a probability map. The second embodiment can use a method that makes use of a phenomenon in which the detected region changes with a threshold used when threshold processing is applied to the probability map. When the threshold is high, the detection amount tends to be small and the accuracy tends to increase, and when the threshold is low, the detection amount tends to be large, and the accuracy tends to decrease. The information processing apparatus 100 of the present embodiment uses a detection result obtained by applying a first threshold (a high threshold) to the probability map as correction target data and corrects the correction target data with reference to a detection result obtained by applying a second threshold (a low threshold) to the probability map. Specifically, the information processing apparatus 100 obtains image information on reference data corresponding to a portion on the correction target data where no detected region is present and interpolate the portion where no detected region is present. In the present embodiment, the parameter for use in correction is the second threshold.

First, the data acquisition unit 201 will be described. The data acquisition unit 201 obtains, as the correction target data, a binary image obtained by applying threshold processing to the probability map obtained by detecting a crack from a wall image of an infrastructure, as in the first embodiment. In the second embodiment, the data acquisition unit 201 further obtains a probability map for use in correction.

Figure 13A:
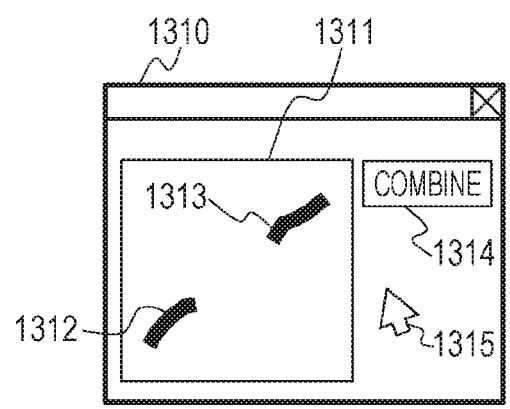
FIGS. 13A and 13B are diagrams illustrating an example display screen according to a second embodiment.

Next, the display control unit 206 will be described. The display control unit 206 displays the correction target data to be corrected by the user. A specific example is displayed on a display screen 1310 in FIG. 13A. An image 1311 on the display screen 1310 corresponds to the region 501 in the image 500 of FIG. 5 showing the entire correction target data. However, since the threshold processing is performed using a different threshold from that in the first embodiment, a different detection result is obtained. Regions 1312 and 1313 are detected regions. The display control unit 206 displays a tool (a combine button) 1314 for giving an instruction to connect the separate detected regions on the display screen 1310.

Next, the receiving unit 202 will be described. The receiving unit 202 performs an operation for setting a region including detected regions that the user wants to connect as the first region and for making a correction for connecting the detected regions. Here, the user wants to perform a processing for connecting the detected regions 1312 and 1313 displayed on the display screen 1310. The user clicks a mouse pointer 1315 over the detected regions 1312 and 1313 for selection. Upon receiving the operation, the receiving unit 202 sets the region including the detected regions 1312 and 1313, that is, the entire region of the image 1311, as the first region. After setting the first region, the user clicks on the combine button 1314 with the mouse pointer 1315 to combine the detected regions 1312 and 1313.

Figure 13B:
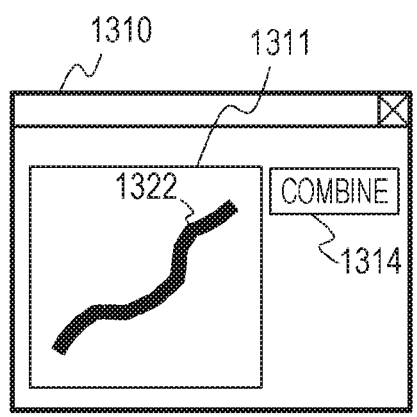

The processing unit 205 repeats the above combination processing using the binary image obtained from the probability map while the adjusting unit 203 is changing the second threshold to search for an appropriate value of the second threshold. Specifically, by repeating acquisition of the detection result by gradually decreasing the value of the second threshold for the first region to find an appropriate parameter for correcting the image 1311. After completion of the processing performed by the adjusting unit 203, the display control unit 206 displays the result of correction. FIG. 13B illustrates a display screen at that time. The detected regions 1312 and 1313 on the display screen 1310 are corrected to, for example, a region 1322.

Thereafter, the determination unit 204 determines a second region to which the adjusted parameter is to be applied. In the present embodiment, the determination unit 204 assumes segmented regions with a similar detection result to belong to the group with the same attribute and determines the segmented regions of the same group as the region including the first region to be the second-region candidates. For example, the density of the detected regions in each segmented region may be used as the attribute. Here, combining a group of detected regions that should not be combined by mistake is prevented by not performing combination processing on a segmented region including many detected regions. After determining the second-region candidates, the determination unit 204 receives an operation for the determination on acceptance from the user via the receiving unit 202, as in the first embodiment, to determine a second region from the second-region candidates.

Figure 14A:
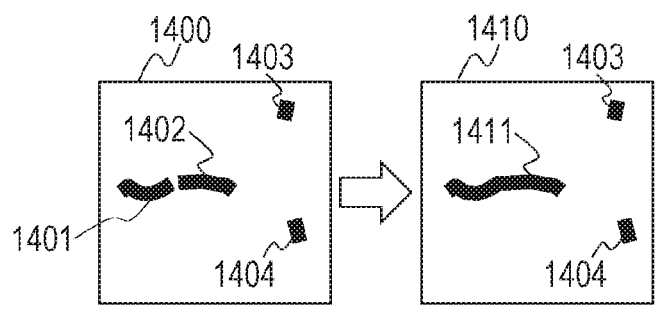
FIGS. 14A and 14B are diagrams illustrating image processing according to the second embodiment.
Figure 14B:
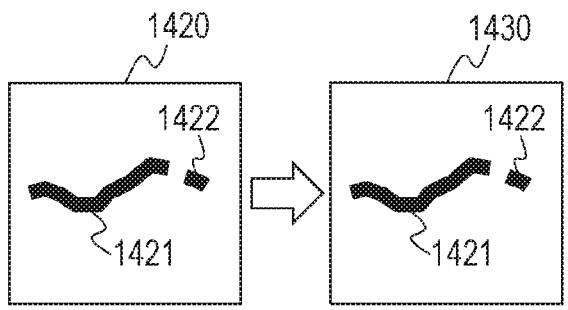

Next, the processing of the processing unit 205 will be described. The processing unit 205 executes the above image processing on the second region using the adjusted parameter to obtain a processing execution result. The processing execution result is illustrated in FIGS. 14A and 14B. Regions 1401, 1402, 1403, and 1404 in an image 1400 of FIG. 14A are detected regions. Regions 1421 and 1422 in an image 1420 of FIG. 14B are detected regions. The image 1400 is a region included in the second region, whereas the image 1420 is a region not included in the second region.

The image 1400 is subjected to the processing of the processing unit 205, so that the processing execution result illustrated in an image 1410 is obtained. The detected regions 1401 and 1402 in the image 1400 are corrected into a detected region 1411. In contrast, the image 1420 and an image 1430 are images of the region that is not subjected to the processing of the processing unit 205 before and after the processing, respectively, in which the detected region is not changed. The above method thus allows appropriate determination of the second region to which an appropriate parameter and processing using the parameter is to be applied in correcting the correction target data using the probability map.

Third Embodiment

An information processing apparatus 100 according to a third embodiment will be described mainly on the difference from the information processing apparatuses 100 according to the first and second embodiments. The information processing apparatus 100 according to the present embodiment uses a landscape captured image as the correction target data. The information processing apparatuses 100 according to the first and second embodiments obtain segmented regions by segmenting the correction target data in a desired size, whereas the information processing apparatus 100 of the third embodiment obtains segmented regions by performing region segmentation processing. The region segmentation processing of the present embodiment is processing of setting the same label to adjacent pixels having similar attributes, such as luminance or color information, as one group. In the present embodiment, the regions to which the same label is set are regarded as one segmented region.

Figure 15A:
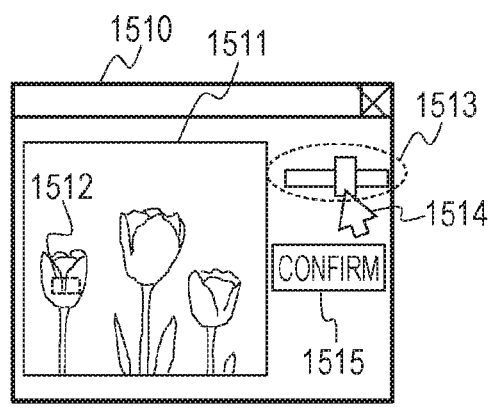
FIGS. 15A and 15B are diagrams illustrating processing for determining a second region according to a third embodiment.
Figure 15B:
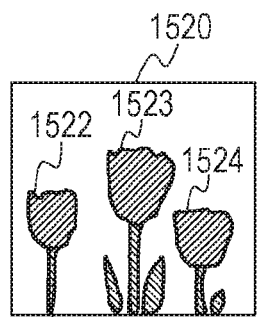

The processing details of the third embodiment will be described with reference to FIGS. 15A and 15B. The correction target data used in the present embodiment is a captured image in which a plurality of flowers are imaged. Here, an appropriate parameter for correcting the saturation of one selected flower region is adjusted, and the adjusted parameter is used also for the other plurality of flowers.

First, the data acquisition unit 201 acquires the captured image as correction target data, and the display control unit 206 displays the captured image that the data acquisition unit 201 acquired as correction target data. An image 1511 on a display screen 1510 illustrated in FIG. 15A is the correction target data.

Next, the receiving unit 202 receives an operation of setting a first region 1512 on the correction target data 1511 from the user. To set the correction target data 1511, two points around the portion to be the first region are set using a mouse pointer 1514 to set a window having the two points on the diagonal. Thereafter, the saturation of the first region is corrected. Here, the display control unit 206 displays a saturation adjusting bar 1513 on the display screen, and the user performs an operation to move the tub of the saturation adjusting bar 1513 from side to side with the mouse pointer 1514 via the receiving unit 202.

Upon receiving this operation, the parameter changes according to the position of the tub. The processing unit 205 applies processing for changing the saturation to the first region 1512 using the parameter that is set at that time to obtain a processing execution result. When receiving the processing execution result, the display control unit 206 displays the processing execution result on the display screen as needed. The user selects a confirm button 1515 with the mouse pointer 1514 at the time the saturation of the first region 1512 reaches a desired saturation to complete the correction. The adjusting unit 203 determines the parameter that is set at that time as a parameter suitable for the first region.

Next, the processing of the determination unit 204 will be described. In the present embodiment, the region segmentation processing is applied to the captured image in the correction target data. The correction target data 1511 is segmented according to the attribute, such as color or luminance, by the region segmentation processing. Specifically, the correction target data 1511 is segmented to regions of similar colors into a flower region indicated by the diagonally shaded region, a grass region indicated by the dotted region, and a sky region, as in an image 1520. In this case, the determination unit 204 obtains color or luminance information on the segmented regions of the correction target data as the attribute and determines a segmented region whose attribute is close to that of the first region as a second-region candidate. In the example of FIG. 15A, a plurality of flower regions 1522, 1523, and 1524 are determined as second-region candidates, as illustrated in FIG. 15B, for which the processing unit 205 corrects the saturation using the parameter determined by the adjusting unit 203. Thus, the correction target data can be corrected using the segmented regions obtained by region segmentation processing.

Fourth Embodiment

An information processing apparatus 100 according to a fourth embodiment will be described mainly on the difference from the information processing apparatuses 100 according to the first to third embodiments. The information processing apparatus 100 of the fourth embodiment interpolates, using the parameter adjusted for the first region, the parameters for regions to which image processing using the adjusted parameter is not applied. The information processing apparatus 100 of the present embodiment performs correction to convert the luminance of each region of correction target data which is a landscape captured image.

Figure 16:
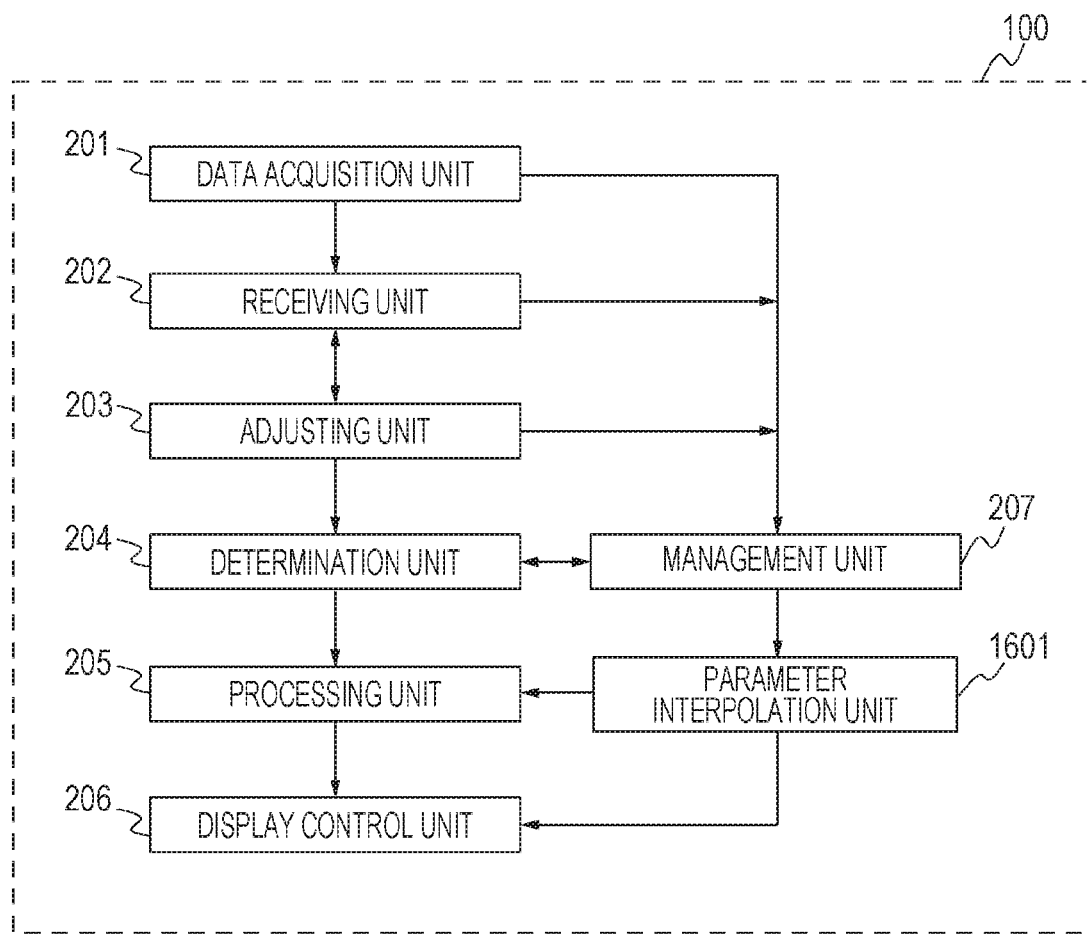
FIG. 16 is a diagram illustrating the functional configuration of an information processing apparatus according to a fourth embodiment.

FIG. 16 is a diagram illustrating the functional configuration of the information processing apparatus 100 according to the fourth embodiment. The information processing apparatus 100 according to the fourth embodiment further includes a parameter interpolation unit 1601 in addition to the functional configuration of the other embodiments. The parameter interpolation unit 1601 formulates, using the adjusted parameter, an interpolation formula for interpolating the parameters for regions to which image processing using the adjusted parameter is not applied. When the attribute of the segmented region is input to the interpolation formula, an appropriate parameter is obtained. The interpolated parameter is sent to the processing unit 205. The processing unit 205 performs image processing using the parameter obtained by the interpolation processing.

First, a processing procedure of a preparatory stage before the parameter interpolation unit 1601 is used will be described, and then the processing of the parameter interpolation unit 1601 will be described. First, the processing of the preparatory stage before the parameter interpolation unit 1601 is used will be described. The processing of the preparatory stage is basically the same as the processing of the first embodiment, in which a procedure similar to that of the first embodiment is repeated until an amount of data required for processing of the parameter interpolation unit 1601 is collected. First, the data acquisition unit 201 obtains correction target data. In the present embodiment, the correction target data is a landscape image of the sky, the sea, and the sand. The obtained correction target data is managed by the management unit 207.

Figure 17A:
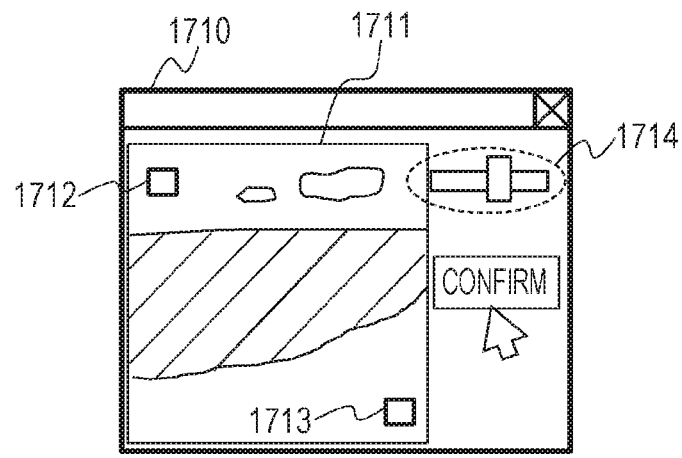
FIGS. 17A and 17B are diagrams illustrating an example of correction target data.

Next, the display control unit 206 displays the correction target data on a display screen 1710, as illustrated in FIG. 17A. Reference sign 1711 denotes the correction target data. On the display screen 1710, the user is prompted to set and correct the first region. Next, the receiving unit 202 receives an instruction to set and correct the first region from the user. Here, the user sets two first regions. The user sets regions 1712 and 1713 of the correction target data 1711 as the first regions using a method for setting a window on the correction target data, as in the third embodiment. Next, the adjusting unit 203 adjusts a parameter for changing the brightness of the first regions according to an operation on a brightness adjustment bar 1714 in the same manner as in the third embodiment.

Figure 17B:
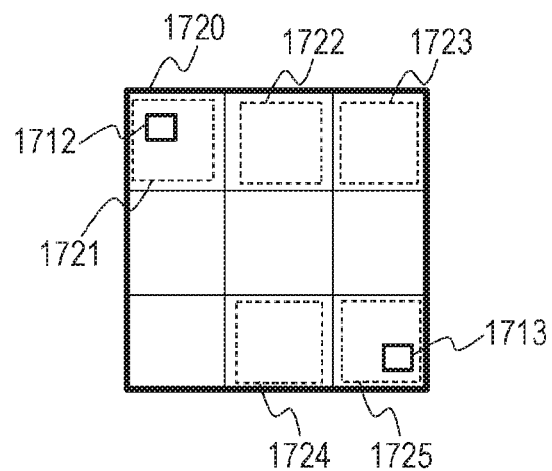

Next, the determination unit 204 segments the correction target data into rectangular regions of any size, obtains the attribute of each segmented region, and determines second-region candidates based on the attributes. In the present embodiment, the segmentation is performed based on the coordinates. An image in which the correction target data is segmented is illustrated in FIG. 17B. An image 1720 is the same image as that of the correction target data 1711, in which the regions 1712 and 1713 are the same as the images 1712 and 1713 in the correction target data 1711, respectively. The grid lines of the correction target data 1720 are the boundaries of the segmented regions obtained by segmenting the correction target data 1711.

The determination unit 204 obtains the attribute of each segmented region after the region segmentation. In the present embodiment, the determination unit 204 obtains coordinate information as the attribute of each segmented region, for example, the central coordinates of the segmented region. The determination unit 204 assumes the same parameter as the parameter of each first region to be suitable for regions whose coordinates are close to the coordinates of the first region and determines the segmented region including the first region and segmented regions close to the first region as the candidates of the second region. In the present embodiment, the second regions to which image processing using the parameters adjusted for the first regions 1712 and 1713 are respectively determined to be segmented regions 1721 and 1725 by the acceptance of the user.

The processing unit 205 applies the processing for converting the brightness using the adjusted parameters to the second regions. The processing execution result is sent to the management unit 207, and the management unit 207 stores and manages the processing execution result as the latest correction target data. The management unit 207 also stores and manages attribute information on the segmented regions, information on the segmented regions determined as the second regions, and information on the parameters used for the segmented regions determined as the second regions. These information is used by the parameter interpolation unit 1601. The above is the processing of the preparatory stage for the processing of the parameter interpolation unit 1601.

Figure 18:
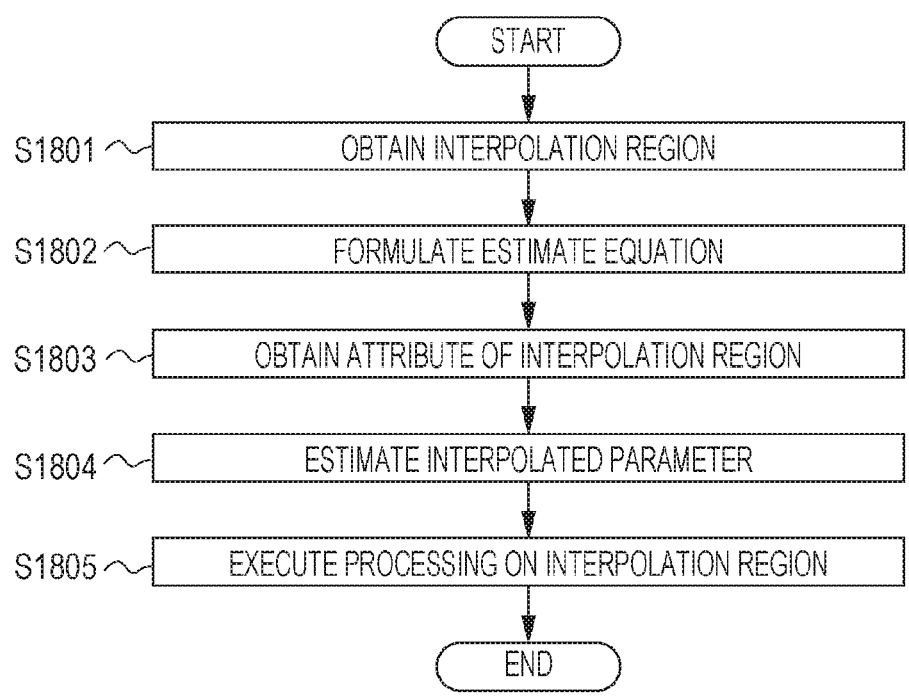
FIG. 18 is a flowchart for parameter interpolation processing.

Next, the parameter interpolation processing performed by the parameter interpolation unit 1601 will be described. FIG. 18 is a flowchart for the interpolation processing. In the present embodiment, it is assumed that a similar parameter can be applied to the vicinity of the image. The parameter interpolation unit 1601 interpolates the parameter for regions for which parameter adjustment is not performed using the parameter adjusted for the first region and attribute information on the segmented regions to which processing using the parameter is applied.

First, at S1801, the parameter interpolation unit 1601 acquires, from the management unit 207, information on the regions for which the parameter is to be interpolated among the segmented regions of the correction target data. In the present embodiment, the parameter interpolation unit 1601 acquires, as the information on the regions for which parameter adjustment is not performed, information on regions in which image processing is not executed at the preparatory stage, for example, segmented regions 1722, 1723, and 1724, from the management unit 207. Such segmented regions to be subjected to the interpolation processing are hereinafter referred to as "interpolation regions". The interpolation regions are regions other than the first region.

Next, at S1802, the parameter interpolation unit 1601 obtains the attribute of each segmented region and information on the parameter used by the processing unit 205 from the management unit 207 to formulate an equation for interpolating a parameter suitable for the interpolation region. For example, the parameter interpolation unit 1601 formulates a linear interpolation formula for interpolating an appropriate parameter based on the attribute of the segmented region, as expressed as Eq. 1, $$y=ax+b \tag{Eq. 1}$$

where x and y are attribute and parameter of each segmented region, respectively, and a and b are weight parameters. The weight parameters a and b are determined by obtaining information on the attribute and the parameter of the segmented region to which the processing of the processing unit 205 has been executed from the management unit 207. In the example of the correction target data 1711 in FIG. 17B, the coordinate information and the parameter information on each of the processed regions 1721 and 1725 are used.

Next, at S1803, the parameter interpolation unit 1601 obtains attribute information on each interpolation region. Next, at S1804, the parameter interpolation unit 1601 calculates y as a result of parameter interpolation suitable for the interpolation region by substituting the attribute information on the interpolation region, obtained at S1803, for x.

Figure 19:
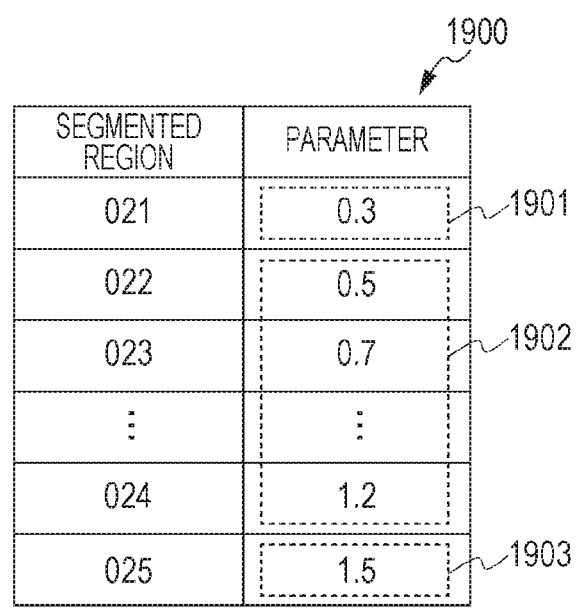
FIG. 19 is a diagram illustrating parameter interpolation processing.

FIG. 19 is a diagram illustrating the parameter interpolation processing. FIG. 19 illustrates a parameter table 1900 showing combinations of a segmented region and a parameter. The portions indicated by dotted lines 1901 and 1903 show parameters adjusted by the adjusting unit 203. The portion indicated by a dotted line 1902 shows parameters interpolated by the parameter interpolation unit 1601. In regions close to the regions with adjusted parameters, values close to the adjusted parameters are interpolated.

Referring back to FIG. 18, at S1805 after the processing of S1804, the processing unit 205 executes processing for each interpolation region using the interpolated parameter. The display control unit 206 may display the processing execution result for each interpolation region to prompt the user to confirm the result of interpolation. The confirmation allows correction suited to user's preference. The above processing allows interpolation of the parameter of a non-adjusted region using the adjusted parameter.

Although, in the fourth embodiment, the parameter interpolation unit 1601 sets two first regions and performs interpolation processing using the adjusted parameters, two or more first regions may be set.

The above embodiments show a method of using the image feature, the detection result, or the coordinate information as the attribute. Alternatively, a convolutional neural network (CNN) feature may be used. The CNN feature is data generated from a feature map obtained by applying a deep learning architecture to the image. Other attributes are features that are manually set by humans, whereas the CNN feature is a feature that is automatically mechanically set. For example, by calculating a histogram from a feature map and using the histogram as the attribute, candidates of the second region can be determined based of the flexible feature.

The information processing apparatuses according to above embodiments can perform appropriate image processing on images without the need for a troublesome user operation.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-037870 filed Mar. 1, 2019, which is hereby incorporated by reference herein in its entirety.

What is claimed is:

1. An apparatus comprising:
a processor; and
a memory storing a program that, when executed by the processor, causes the processor to perform functions as:
an acquisition unit configured to acquire detection data indicating a result of detection of a defect from a captured image of a structure,
a display control unit configured to display an image showing the detection data on a display device,
a receiving unit configured to receive an operation to specify part of the displayed image as a first region and an instruction to correct at least part of the detection data corresponding to the first region,
an adjusting unit configured to adjust a parameter related to the detection data and corresponding to the first region according to the received instruction,
a determination unit configured to determine one or more second regions to which the parameter applied to the first region is to be applied, the parameter being adjusted by the adjusting unit, from a plurality of partial regions obtained by segmenting the image, and
a segmentation unit configured to segment the image into the plurality of partial regions,
wherein the determination unit determines the one or more second regions from among the plurality of partial regions based on an attribute of the first region and an attribute of each of the plurality of partial regions.

2. The apparatus according to claim 1, wherein the display control unit displays the image showing the detection data on the display device in a manner as to superpose the image on the captured image.

3. The apparatus according to claim 1,
wherein the determination unit determines a plurality of second-region candidates from among the plurality of partial regions based on an attribute of the first region and an attribute of each of the plurality of partial regions,
wherein the display control unit displays the plurality of second-region candidates on the display device, and
wherein the determination unit determines the one or more second regions from among the displayed second-region candidates according to a user operation on the plurality of displayed second-region candidates.

4. The apparatus according to claim 1, wherein the attribute comprises information on color, saturation, luminance, and texture of the image.

5. The apparatus according to claim 4, wherein the display control unit displays the image after superposing an image of a predetermined color on a region other than the second-region candidates or converting brightness of the region other than the second-region candidates.

6. The apparatus according to claim 1, wherein the segmentation unit segments the image into the plurality of partial regions based on an attribute of the image.

7. The apparatus according to claim 3, wherein the attribute comprises at least one of a feature of the image, the result of detection of the defect on the image, coordinates, and a histogram obtained from a convolutional neural network (CNN) feature.

8. The apparatus according to claim 3, wherein the display control unit distinguishably displays, of the plurality of partial regions, the second-region candidates and a region other than the second-region candidates.

9. The apparatus according to claim 8, wherein the display control unit displays a boundary between the second-region candidates and the region other than the second-region candidates in a different color from a color of the image.

10. The apparatus according to claim 3, wherein the display control unit distinguishably displays the second-region candidates and other regions in sequence in units of the partial regions.

11. The apparatus according to claim 1, wherein the image showing the detection data is a binary image obtained by binarizing pixels of the captured image based on a score of each pixel indicating a possible defect.

12. The apparatus according to claim 11,
wherein the parameter is a threshold value for an area of a detected region of the binary image in which pixels that are determined to be possibly defects continue, and
wherein a detected region whose area is smaller than the threshold value is deleted from the binary image by increasing the parameter.

13. The apparatus according to claim 11,
wherein the parameter is a threshold value for binarizing the score indicating the possible defect of each pixel of the captured image to generate the binary image, and
wherein a pixel that exhibits the defect is increased in the binary image by decreasing the parameter.

14. The apparatus according to claim 1, wherein, after image processing is executed on the first region using a predetermined parameter, the adjusting unit repeats processing for generating an image showing the detection data while changing the parameter based on the instruction received by the receiving unit and determines a parameter to be applied to the first region based on a comparison between the image showing the detection result and the image requested by the instruction.

15. The apparatus according to claim 1, wherein the adjusting unit determines the parameter to be applied to the first region according to a user operation.

16. The apparatus according to claim 1, wherein the processor further performs functions as:
a management unit configured to store the region specified as the first region in a storage unit,
wherein the determination unit determines the one or more second regions from a region other than the region set as the first region.

17. The apparatus according to claim 1, wherein the defect comprises a crack generated on a surface of the structure.

18. The apparatus according to claim 1, wherein the determination unit determines the one or more second regions from among the plurality of partial regions based on a similarity to the first region.

19. A method for information processing executed by an apparatus, the method comprising:
acquiring detection data indicating a result of detection of a defect from a captured image of a structure;
displaying an image showing the detection data on a display device;
receiving an operation to specify part of the displayed image as a first region and an instruction to correct at least part of the detection data corresponding to the first region;
adjusting a parameter to be applied to the first region according to the received instruction;
determining one or more second regions to which the parameter applied to the first region is to be applied, the parameter being adjusted by the adjusting unit, from a plurality of partial regions obtained by segmenting the image; and
segmenting the image into the plurality of partial regions,
wherein the determining determines the one or more second regions from among the plurality of partial regions based on an attribute of the first region and an attribute of each of the plurality of partial regions.

20. A non-transitory computer-readable recording medium storing a program that causes a computer to function as:
an acquisition unit configured to acquire detection data indicating a result of detection of a defect from a captured image of a structure;
a display control unit configured to display an image showing the detection data on a display device;
a receiving unit configured to receive an operation to specify part of the displayed image as a first region and an instruction to correct at least part of the detection data corresponding to the first region;
an adjusting unit configured to adjust a parameter related to the detection data and corresponding to the first region according to the received instruction;
a determination unit configured to determine one or more second regions to which the parameter applied to the first region is to be applied, the parameter being adjusted by the adjusting unit, from a plurality of partial regions obtained by segmenting the image; and
a segmentation unit configured to segment the image into the plurality of partial regions,
wherein the determination unit determines the one or more second regions from among the plurality of partial regions based on an attribute of the first region and an attribute of each of the plurality of partial regions.

* * * * *